(12) United States Patent
Zhao et al.

(10) Patent No.: US 11,687,160 B2
(45) Date of Patent: Jun. 27, 2023

(54) ACTIVE CONTROL AND CALIBRATION OF HAPTIC TRACKPAD

(71) Applicant: Microsoft Technology Licensing, LLC, Redmond, WA (US)

(72) Inventors: Tianyu Zhao, Kirkland, WA (US); Anteneh Detamo, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/319,334

(22) Filed: May 13, 2021

(65) Prior Publication Data
US 2022/0365601 A1  Nov. 17, 2022

(51) Int. Cl.
*G06F 3/01* (2006.01)
*G06F 3/0354* (2013.01)
*G06F 3/038* (2013.01)

(52) U.S. Cl.
CPC .............. *G06F 3/016* (2013.01); *G06F 3/038* (2013.01); *G06F 3/03547* (2013.01)

(58) Field of Classification Search
CPC ....... G06F 3/016; G06F 3/03547; G06F 3/038
See application file for complete search history.

(56) References Cited

U.S. PATENT DOCUMENTS

| | | | | |
|---|---|---|---|---|
| 10,372,214 B1* | 8/2019 | Gleeson | ................ | G06F 3/0416 |
| 11,079,849 B1* | 8/2021 | Knoppert | ................ | G06F 3/038 |
| 2009/0174678 A1* | 7/2009 | Mathew | ................ | G06F 1/1616 345/173 |
| 2010/0245254 A1* | 9/2010 | Olien | .................... | G06F 1/1626 345/173 |
| 2011/0291821 A1* | 12/2011 | Chung | .................. | G06F 3/0416 340/407.2 |
| 2012/0232780 A1* | 9/2012 | Delson | .................... | A63F 13/24 340/407.1 |
| 2012/0327025 A1 | 12/2012 | Huska et al. | | |

(Continued)

FOREIGN PATENT DOCUMENTS

| | | |
|---|---|---|
| CN | 112491323 A | 3/2021 |
| EP | 1063760 A2 | 12/2000 |
| WO | 2019173781 A1 | 9/2019 |

OTHER PUBLICATIONS

"International Search Report and Written Opinion Issued in PCT Application No. PCT/US22/024177", dated Jul. 21, 2022, 13 Pages.

*Primary Examiner* — Ariel A Balaoing
(74) *Attorney, Agent, or Firm* — Holzer Patel Drennan

(57) ABSTRACT

Variations in the manufacturing, tolerances, and environmental conditions, for example, of haptic trackpads can cause mechanical properties to vary click-by-click and unit-by-unit. Also, as time goes, mechanical wear or material degradation within each trackpad may change its mechanical properties. All of which may cause the haptic response received by the user to vary across similarly designed trackpads, and also change over time on the same trackpad. This may be interpreted by the user as an indication of low product quality. The following describes in detail haptic trackpads including accelerometers that enable active control and/or calibration. This allows for a more uniform user experience across a manufacturing run of trackpads and/or throughout the projected life of individual trackpads.

20 Claims, 10 Drawing Sheets

(56) References Cited

U.S. PATENT DOCUMENTS

| | | | |
|---|---|---|---|
| 2013/0207793 A1* | 8/2013 | Weaber | G06F 3/03543 340/407.2 |
| 2014/0002113 A1* | 1/2014 | Schediwy | G06F 3/0446 324/661 |
| 2014/0085065 A1 | 3/2014 | Biggs et al. | |
| 2014/0135804 A1* | 5/2014 | Weisenburgh, II | A61B 17/320092 606/169 |
| 2014/0210758 A1* | 7/2014 | Park | G06F 3/0482 345/173 |
| 2016/0179260 A1* | 6/2016 | Ham | G06F 3/0412 345/173 |
| 2017/0344117 A1 | 11/2017 | Yamazaki et al. | |
| 2018/0081483 A1* | 3/2018 | Camp | G06F 3/016 |
| 2018/0275759 A1* | 9/2018 | Alghooneh | G06F 3/016 |
| 2019/0163294 A1* | 5/2019 | Kanai | G06F 1/169 |
| 2019/0310709 A1 | 10/2019 | Yamazaki et al. | |
| 2019/0325716 A1* | 10/2019 | Khoshkava | G08B 6/00 |
| 2020/0133397 A1* | 4/2020 | Mori | G06F 3/016 |
| 2020/0150767 A1* | 5/2020 | Karimi Eskandary | G06F 3/016 |
| 2020/0328711 A1 | 10/2020 | Mortazav et al. | |
| 2020/0341584 A1 | 10/2020 | Wang et al. | |

* cited by examiner

ACTIVE CONTROL AND CALIBRATION OF HAPTIC TRACKPAD

BACKGROUND

A trackpad (also referred to as a touchpad) is a pointing device featuring a tactile sensor that can detect the position and motion and of a user's finger(s) on a sensing surface and convert the detected position and motion into a digital output. The digital output of the trackpad is input to an operating system, which in turn displays a position and motion of a cursor corresponding to the user's finger(s) on a display screen of a computing device.

Some trackpads are "clickable" (also referred to as clickpads), which refers to an additional ability to detect a magnitude of force on or displacement of the sensing surface caused by the user's finger(s) and include force/displacement magnitude in the digital output. The operating system may utilize the force/displacement magnitude applied by the user's finger(s) to determine if the user intends to "click" the trackpad in the detected position and with the detected motion of the user's finger(s). Supplementing the movement stroke of a trackpad with a haptic response is one way to provide feedback to a user, for example, by indicating that sufficient force has been detected by the trackpad to register a "click."

SUMMARY

Implementations described and claimed herein provide a trackpad comprising a printed circuit board (PCB) including a touch interface, a haptic element fixedly attached to the PCB to selectively oscillate the PCB, an accelerometer fixedly attached to the PCB to measure peak-to-peak acceleration of the oscillation of the PCB, and a microcontroller. The microcontroller compares the measured peak-to-peak acceleration with a target peak-to-peak acceleration of the oscillation of the PCB and adjusts an output of the haptic element to change the measured peak-to-peak acceleration to match the target peak-to-peak acceleration of the oscillation of the PCB.

Implementations described and claimed herein further provide a method for actively controlling a trackpad comprising measuring peak-to-peak acceleration of a haptic event oscillation of a printed circuit board (PCB) including a touch interface using an accelerometer fixedly attached thereto, comparing the measured peak-to-peak acceleration with a target peak-to-peak acceleration of the oscillation of the PCB, and adjusting an output of a haptic element fixedly attached to the PCB to change the measured peak-to-peak acceleration to match the target peak-to-peak acceleration of the oscillation of the PCB.

Implementations described and claimed herein still further provide a haptic button comprising a frame, a printed circuit board (PCB), a resiliently deflectable spacer oriented between the frame and the PCB, the resiliently deflectable spacer to permit shear displacement of the PCB with reference to the frame, a haptic element fixedly attached to the PCB to selectively oscillate the PCB, an accelerometer fixedly attached to the PCB to measure peak-to-peak acceleration of the oscillation of the PCB, and a microcontroller. The microcontroller compares the measured peak-to-peak acceleration with a target peak-to-peak acceleration of the oscillation of the PCB and adjusts an output of the haptic element to change the measured peak-to-peak acceleration to match the target peak-to-peak acceleration of the oscillation of the PCB.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

In mass production scale, there are variations in the manufacturing, tolerances, and environmental conditions, for example, which may cause mechanical properties of a run of trackpads to vary click-by-click and unit-by-unit. Also, as time goes, mechanical wear or material degradation within each trackpad may change its mechanical properties. All of which may cause the haptic response received by the user to vary across similarly designed trackpads, and also change over time on the same trackpad. This may be interpreted by the user as an indication of low product quality.

The following describes in detail haptic trackpads including accelerometers that enable the disclosed active control and/or calibration. The disclosed haptic trackpads allow for a more uniform user experience across a manufacturing run of trackpads and/or throughout the projected life of individual trackpads.

Figure 1:
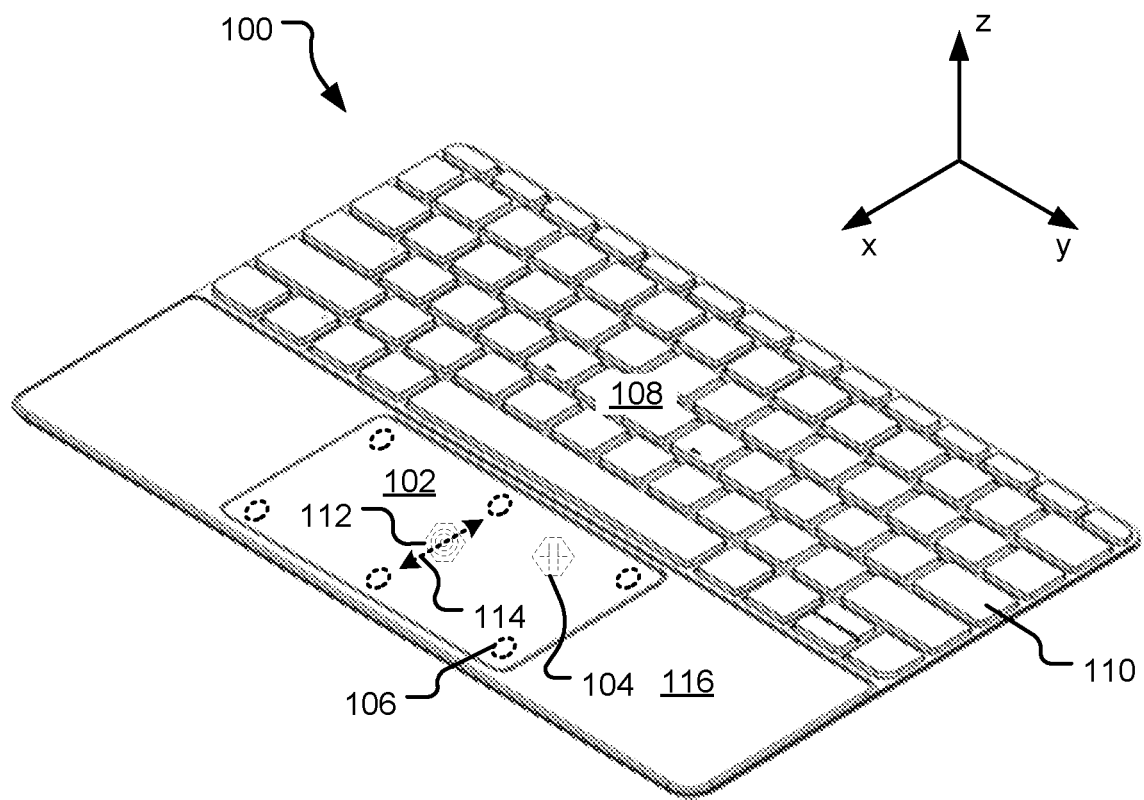
FIG. 1 illustrates a perspective view of an example keyboard including a haptic trackpad with an accelerometer and using active control and/or calibration according to the presently disclosed technology.

FIG. 1 illustrates a perspective view of an example keyboard 100 including a haptic trackpad 102 with an accelerometer 104 and using active control and/or calibration according to the presently disclosed technology. Generally, the keyboard 100 includes a keypad 108 and the haptic trackpad 102 mounted within a frame 116. The keypad 108 contains an array of keys (e.g., key 110) arranged in a predetermined pattern (e.g., QWERTY). Each key within the keypad 108 may be communicatively connected to an associated computing device (also not shown). The haptic trackpad 102 (also referred to herein as a user-depressible touchpad or mousepad) converts physical user inputs into corresponding electrical signals that may be interpreted by the computing device, as well as providing haptic feedback to the user.

The keyboard 100 may also secure additional electronic components or other user-depressible interface components (e.g., push buttons, dials, and/or knobs, not shown). In various implementations, some or all of the haptic trackpad 102, individual keys of the keypad 108, and the push buttons, dials, and/or knobs incorporated within the keyboard 100 may incorporate accelerometers and use active control and/or calibration as further described in detail below.

The haptic trackpad 102 (or other user-depressible interface that incorporates accelerometers and uses active control and/or calibration) may have a variety of mechanical arrangements that achieve a specified physical depression magnitude (or travel), with a variety of force-deflection profiles. Resiliently deflectable spacers (e.g., spacer 106 are spaced apart across an x-y plane of the haptic trackpad 102. While 6 spacers are depicted, in other implementations greater or fewer spacers may be used. The resiliently deflectable spacers provide x-y plane compliance and separate a PCB and associated touch sensor (also referred to as a touch glass or simply glass) from another resiliently deflectable structure that provides compliance in the z-direction (e.g., cantilever spring 224 of FIG. 2), but not in the x-y plane. In various implementations, the physical depression in the z-direction is used as a proxy for z-direction force measurement, as applied by a user, on the haptic trackpad 102.

While the haptic trackpad 102 is capable of physical depression in order to detect the force magnitude applied on the haptic trackpad 102, the physical depression may be insufficient to provide a user an adequate trackpad feel and feedback. For example, the depression may be too small for the user to gauge application of adequate pressure to constitute a "click." To enhance the user's perception of adequate pressure to constitute a "click," the haptic trackpad 102 includes haptic element 112 that is actuated by and works in conjunction with the physical travel of the haptic trackpad 102 to give physical feedback to the user that adequate force to constitute a "click" has been detected by the haptic trackpad 102. This may offer the user a feel and overall performance comparable to a traditional clickable button snap-over collapsing in physical travel.

The haptic element 112 generates haptic feedback in the form of a user-perceptible "click" by generating vibration or other repeated forces or motions (collectively, haptic responses) and transmitting the generated vibration, forces, or motions to the user via the haptic trackpad 102 concurrently with or immediately before or after the physical travel of the haptic trackpad 102 caused by the user's application of force on the haptic trackpad 102. The haptic element 112 may utilize a variety of technologies to generate the vibration or other repeating forces or motions (e.g., weighted and unbalanced (linear or rotational) motors or electromagnetic actuators, linear resonant actuators (LRAs) solenoids, direct drive actuators, piezoelectric devices, vibra-motors, electrostatic feedback devices, and ultrasonic devices).

In various implementations, the haptic feedback is defined as any repeating oscillating motion that exceeds 5 g of acceleration and an approximately 100-micron displacement, while overall staying in position. The haptic feedback may also include a noise generated by the haptic element 112 as it oscillates (e.g., via resonance or collision of adjacent parts within the haptic trackpad 102). As an example, linear oscillating vibration of the haptic trackpad 102 driven by the haptic element 112 is illustrated by dotted arrow 114, which is oriented along the x-axis of the haptic trackpad 102. In other implementations, the linear oscillating vibration is oriented along the y-axis or a combination of the x-axis and the y-axis of the haptic trackpad 102. A rotational oscillating vibration may be oriented within the x-y plane of the haptic trackpad 102.

In various implementations, depending upon the computing device type and construction, the frame 116 may be a device bucket or mid-frame, which serves as a structural framework for the keyboard 100. The resiliently deflectable spacers connect portions of the haptic trackpad 102 to the frame 116 via the z-direction resiliently deflectable structure. In order for the haptic element 112 to vibrate the haptic trackpad 102 within the x-y plane, the haptic trackpad 102 is designed for compliance in the x-y plane with reference to the frame 116 using the resiliently deflectable spacers. This allows the haptic trackpad 102 to be capable of movement caused by the haptic element 112 in the x-y plane with reference to the frame 116.

The accelerometer 104 is used to detect haptic acceleration (e.g., characterized herein as peak-to-peak acceleration) of the haptic trackpad 102 in real-time. More specifically, peak-to-peak acceleration (or PTP acceleration) is the difference between maximum positive and maximum negative amplitudes of a waveform describing the haptic acceleration of the haptic trackpad 102. The accelerometer 104 is fixedly attached to an associated PCB so that it moves in unison with the PCB. This achieves a technical effect of an acceleration measurement by the accelerometer 104 being equivalent to acceleration of the PCB. The accelerometer 104 may feed acceleration data to a microcontroller unit (MCU), not shown, see e.g., MCU 244 of FIG. 2), which calibrates the trackpad 102 initially or periodically and/or actively controls the trackpad 102 during its usage over time and total lifespan (e.g., using a control loop, as further discussed below). Further, the acceleration data may be used to introduce more features to the trackpad 102 in order to provide a consistent and therefore improved click experience for the user.

XYZ coordinates are shown and described to illustrate directional features of the disclosed technology. Other coordinate systems may also be used with different orientations with similar effect. Further, various aspects of the haptic trackpad 102 (e.g., the haptic element 112, the accelerometer 104, and the resiliently deflectable spacers) are depicted in broken lines in FIG. 1. These features would not normally be visible from an exterior of the keyboard 100 and/or may appear far different from the depictions in FIG. 1 but are nonetheless shown to illustrate the disclosed technology.

In various implementations, the keyboard 100 may itself be considered a computing device or be physically and/or communicatively coupled to a tablet computer, a laptop computer, a personal computer, a gaming device, a smart phone, or any other discrete device that carries out one or more specific sets of arithmetic and/or logical operations. Further, features of the haptic trackpad 102, including the haptic element 112, the accelerometer 104, and the resiliently deflectable spacers, may be applied to any push button or other user-depressible interface component with a touch interface, with or without the keyboard 100. For example, the user-depressible interface component may be applied to vehicles (e.g., automobiles, watercraft, and aircraft), consumer electronics (e.g., cameras, telephones, and home appliances), and industrial or commercial machinery.

Figure 2:
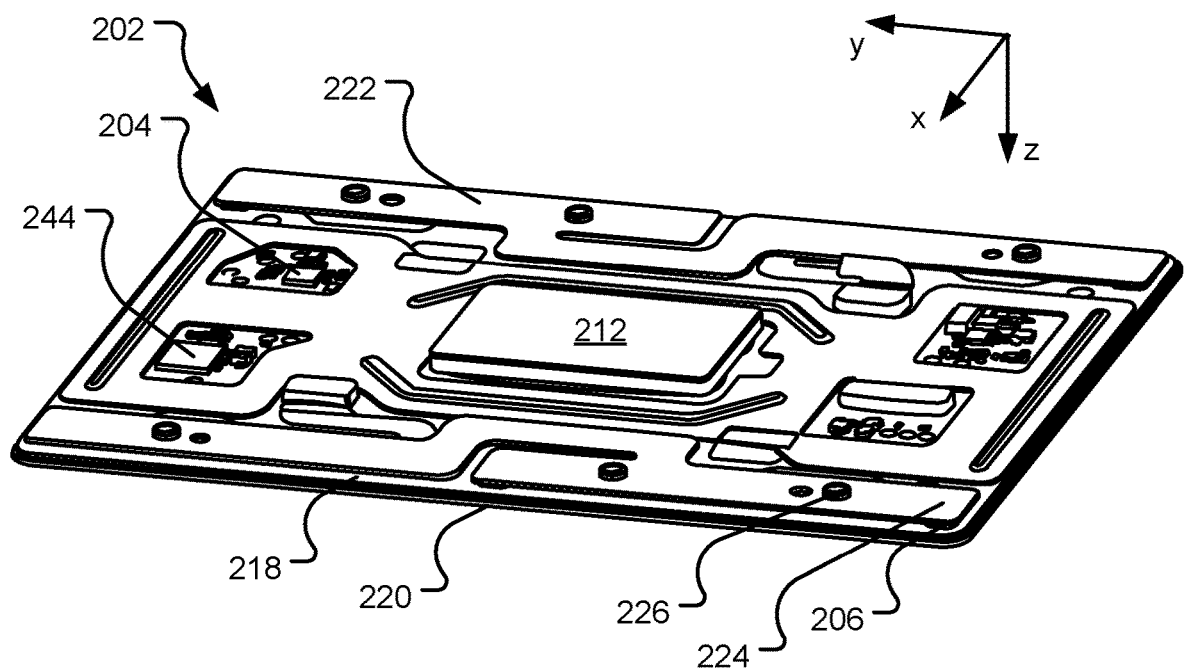
FIG. 2 illustrates a perspective underside view of an example haptic trackpad with an accelerometer and using active control and/or calibration according to the presently disclosed technology.

FIG. 2 illustrates a perspective underside view of an example haptic trackpad 202 with an accelerometer 204 and using active control and/or calibration according to the presently disclosed technology. The haptic trackpad 202 converts physical user inputs, into corresponding electrical signals that may be interpreted by a computing device (not shown). The haptic trackpad 202 also provides haptic feedback to the user. The haptic trackpad 202 is illustrated in a perspective underside view, which illustrates components that would not be ordinarily be visible when the trackpad 202 is installed within a keyboard (e.g., attached to frame 116 of keyboard 100 of FIG. 1) or other computing device.

The haptic trackpad 202 is made up of a printed circuit board (PCB) 218 with a touch interface 220 (e.g., a mylar or glass layer) mounted thereon (e.g., with a pressure-sensitive adhesive, not shown, adhering the touch interface 220 to the PCB 218). The PCB 218 detects location, size, and motion of the user's touch inputs on the touch interface 220 and the PCB 218 converts the location, size, and motion of the user's touch inputs into an electronic signal that can be interpreted by the computing device. The PCB 218 may utilize capacitive or resistive technology for sensing the user's touch inputs through the touch interface 220, as examples. Further, the various components of the haptic trackpad 202 may be permanently bonded or laminated together.

The PCB 218 and the associated touch interface 220 is attached to a mounting plate 222 via an array of spaced resiliently deflectable spacers (e.g., resiliently deflectable spacer 206). The resiliently deflectable spacers support the PCB 218 is a spaced relationship with the mounting plate 222 in a z-direction but permit compliance in an x-y plane so that the PCB 218 and the associated touch interface 220 may selectively vibrate to provide haptic feedback to the user. In various implementations, the resiliently deflectable spacers are of a rubber, silicone, plastic, and/or composite construction.

The mounting plate 222 includes an array of cantilever springs (e.g., cantilever spring 224) that permit the mounting plate 222 to deflect in the z-direction and one or more force sensors (e.g., adhered strain gauges, printed micro-strain gauges, force sensing resistors, etc., not shown) that measure the z-direction deflection of the mounting plate 222. In other example implementations, the force sensors are parallel plate capacitors that measures applied force using an electrostatic sensor. Further, the force sensors may incorporate one or more of capacitive, inductive, magnetic, optical, ultrasonic, and hall effect technology.

The measured z-direction deflection of the mounting plate 222 is used as a measurement of force applied on the touch interface 220 by the user. A first end of each of the cantilever springs is mounted to one of the resiliently deflectable spacers, while a second end of each of the cantilever springs is attached to a frame (e.g., a midframe or device bucket, not shown) of the haptic trackpad 202 via bolt(s) or screw(s) (e.g., bolt 226). In other implementations, the cantilever springs may not be contiguous with the mounting plate 222 and may be otherwise fixedly attached to the frame. The frame serves as a structural framework for the haptic trackpad 202 and includes a cavity (not shown) that receives the cantilever springs when the user depresses the touch interface 220 and the cantilever springs collapse into the cavity.

The cantilever springs are resiliently deflectable and provide a predictable force-deflection profile for collapse into and rebound from the cavity, which aids in accurately measuring the physical depression magnitude of the haptic trackpad 202, and thus the applied force on the touch interface 220. In various some implementations, the cantilever springs suspend the PCB 218 over the cavity. The technical effect is that the cavity provides room within the haptic trackpad 202 for movement of the PCB in the z-direction without contact with a frame and permit the PCB 218 to oscillate in and out of the cavity when excited by the haptic element 212. In various implementations, the mounting plate 222, including the cantilever springs may be made of a metal alloy, including spring steel, a plastic, or a composite material. In other implementations, different types of springs may be used in place of the cantilever springs (e.g., helical, arc, volute, leaf, etc.).

In the depicted implementation, there are 6 pairings of resiliently deflectable spacers and associated cantilever springs arranged about a perimeter of the PCB 218. This provides a distribution of load applied to the PCB 218 and associated touch interface 220 in response to the user's applied force. In other implementations, there may be greater or fewer resiliently deflectable spacer/cantilever springs pairings and/or differently located resiliently deflectable spacer/cantilever springs pairings, so long as the PCB 218 is adequately supported from the mounting plate 222 in the z-direction and has adequate compliance in the x-y plane to provide haptic feedback to the user.

Further, the number of cantilever springs may not be equal to the number of resiliently deflectable spacers. The total resiliently deflectable spacers and/or cantilever springs may be spread across an x-y planar area of the haptic trackpad 202 to distribute reaction force to the physical user inputs, as well as provide a cumulative resistance to deflection necessary for proper haptic trackpad 202 operation within a range of physical user input forces expected from the user. Further, as noted above, there may be one or more force sensors to measure deflection in the z-direction. In the case that multiple force sensors are used, outputs from the multiple force sensors may be averaged or otherwise combined to output a more accurate measurement of displacement of the PCB 218 and associated touch interface 220, and by proxy, the force applied by the user.

While the haptic trackpad 202 is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad 202 includes haptic element 212 that works in conjunction with the physical travel of the haptic trackpad 202 to give physical feedback to the user that adequate force to constitute a "click" has been applied to the haptic trackpad 202. This may offer the user a feel and overall performance comparable to a traditional clickable button snap-over collapsing in physical travel.

The haptic element 212 indicates the user-perceptible "click" by generating vibration or other repeated forces or motions (collectively, a haptic response), transmitting the haptic response to the PCB 218, and to the user via the touch interface 220 concurrently with or immediately before or after the physical depression of the haptic trackpad 202. In various implementations, the haptic element 212 oscillates linearly along an axis within the x-y plane or rotationally within the x-y plane of the haptic trackpad 202.

The accelerometer 204 is used to detect haptic acceleration (e.g., characterized herein as peak-to-peak acceleration) of the haptic trackpad 202 in real-time. More specifically, peak-to-peak acceleration (or PTP acceleration) is the difference between maximum positive and maximum negative amplitudes of a waveform describing the haptic acceleration of the haptic trackpad 202. In various implementations, the accelerometer 204 may be a discrete component surface mounted to the PCB 218 (as illustrated), a flexible printed circuit that is bonded to the PCB 218 and/or the touch interface 220 or integrated into a microcontroller unit (MCU) 244 for the haptic trackpad 202, as examples. The accelerometer 204 may feed acceleration data to the MCU 244, which calibrates the trackpad 202 initially or periodically and/or actively controls the trackpad 202 during its usage over time and total lifespan (e.g., using a control loop, as further discussed below). Further, the acceleration data may be used to introduce more features to the trackpad 202 in order to provide a consistent and therefore improved click experience for the user.

XYZ coordinates are shown and described to illustrate directional features of the disclosed technology. Other coordinate systems may also be used with different orientations with similar effect. In various implementations, the haptic trackpad 202 may be physically and/or communicatively coupled to a variety of computing devices, such as a tablet computer, a laptop computer, a personal computer, a gaming device, a smart phone, or any other discrete device that carries out one or more specific sets of arithmetic and/or logical operations. Further, features of the haptic trackpad 202, including the accelerometer 204, may be applied to a haptic push button with a touch interface used for any practical application.

Figure 3:
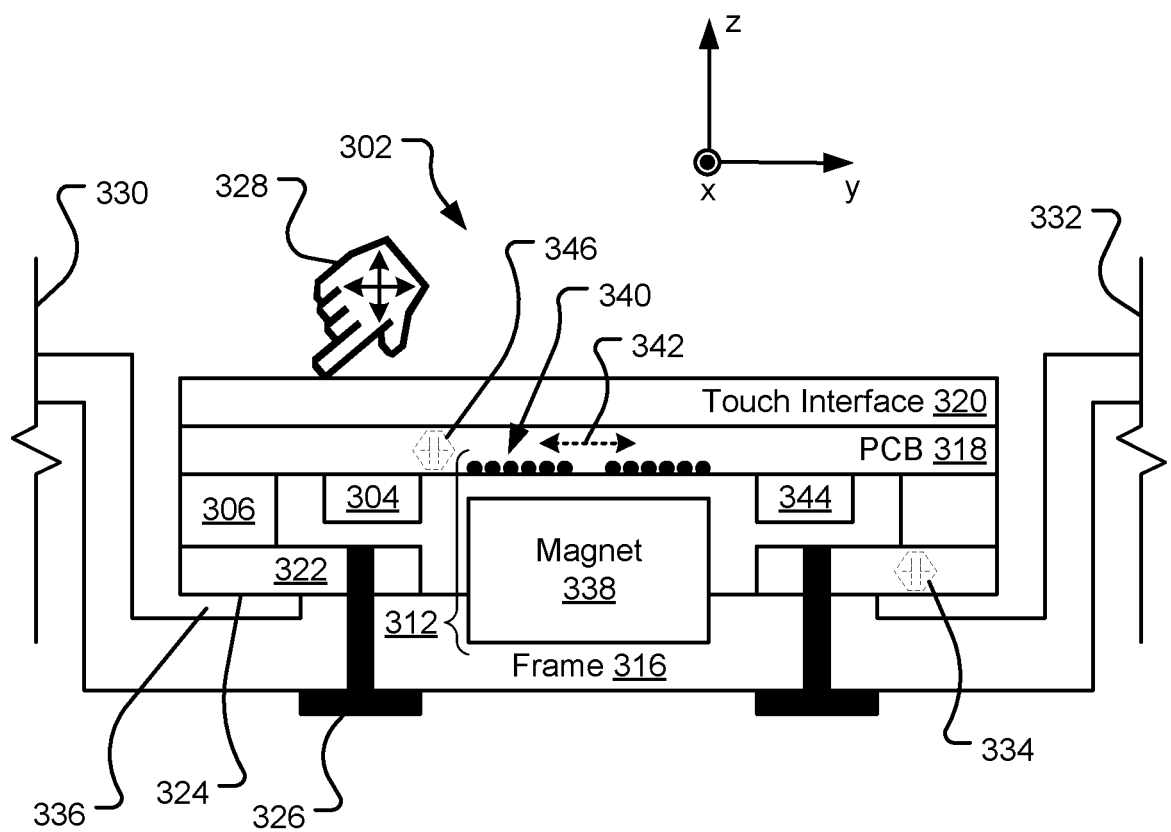
FIG. 3 illustrates a partial sectional elevation view of an example haptic trackpad with an accelerometer using active control and/or calibration according to the presently disclosed technology.

FIG. 3 illustrates a partial sectional elevation view of an example haptic trackpad 302 with an accelerometer 304 using active control and/or calibration according to the presently disclosed technology. The haptic trackpad 302 converts physical user input, illustrated as applied by user's hand 328, into corresponding electrical signals that may be interpreted by a computing device (not shown). The haptic trackpad 302 also provides haptic feedback to the user via the user's hand 328. The haptic trackpad 302 is illustrated in partial sectional view, as indicated by break lines 330, 332.

The haptic trackpad 302 is made up of a printed circuit board (PCB) 318 with a touch interface 320 (e.g., a mylar or glass layer) mounted thereon (e.g., with a pressure-sensitive adhesive, not shown, adhering the touch interface 320 to the PCB 318). The PCB 318 detects location, size, and motion of the user's touch inputs on the touch interface 320 and the PCB 318 converts the location, size, and motion of the user's touch inputs into an electronic signal that can be interpreted by the computing device. The PCB 318 and the associated touch interface 320 is attached to a mounting plate 322 via an array of spaced resiliently deflectable spacers (e.g., resiliently deflectable spacer 306). The resiliently deflectable spacers support the PCB 318 is a spaced relationship with the mounting plate 322 in a z-direction but permit compliance in an x-y plane so that the PCB 318 and the associated touch interface 320 may selectively vibrate to provide haptic feedback to the user.

The mounting plate 322 includes an array of cantilever springs (e.g., cantilever spring 324) that permit the mounting plate 322 to deflect in the z-direction and one or more force sensors (e.g., force sensor 334) that measure the z-direction deflection of the mounting plate 322. The measured z-direction deflection of the mounting plate 322 is used as a measurement of force applied on the touch interface 320 by the user's hand 328. A first end of each of the cantilever springs is mounted to one of the resiliently deflectable spacers, while a second end of each of the cantilever springs is attached to a frame 316 of the haptic trackpad 202 via bolt(s) or screw(s) (e.g., bolt 326). The frame serves as a structural framework for the haptic trackpad 302, as well as a palm rest for the user, and includes a cavity 336 that receives the cantilever springs when the user's hand 328 depresses the touch interface 320 and the cantilever springs collapse into the cavity 336.

While a matched pair of resiliently deflectable spacers and associated cantilever springs is depicted in FIG. 3, as FIG. 3 is an illustration of a partial sectional elevation view, the haptic trackpad 302 may include additional resiliently deflectable spacers and/or cantilever springs that are not shown. The additional resiliently deflectable spacers and/or cantilever springs may be configured similarly to the resiliently deflectable spacer 306 and the cantilever spring 324, as described in detail below. The total resiliently deflectable spacers and/or cantilever springs may be spread across an x-y planar area of the haptic trackpad 302 to distribute reaction force to the physical user inputs applied by the user's hand 328, as illustrated in FIG. 2 and described above, for example. This provides a cumulative resistance to deflection necessary for proper haptic trackpad 302 operation within a range of physical user input forces expected from the user's hand 328.

While the haptic trackpad 302 is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad 302 includes haptic element 312 that works in conjunction with the physical travel of the haptic trackpad 302 to give physical feedback to the user that adequate force to constitute a "click" has been applied to the haptic trackpad 302. This may offer the user a feel and overall performance comparable to a traditional clickable button snap-over collapsing in physical travel.

The haptic element 312 indicates the user-perceptible "click" by generating vibration or other repeated forces or motions (collectively, a haptic response), transmitting the haptic response to the PCB 318, and to the user via the touch interface 320 concurrently with or immediately before or after the physical depression of the haptic trackpad 302. In various implementations, the haptic element 312 oscillates linearly along an axis within the x-y plane or rotationally within the x-y plane of the haptic trackpad 302.

The haptic element 312 includes an actuator magnet 338 with a fixed polarity bonded to the frame 316 and a haptic coil 340 (e.g., one or more spiral wound racetracks of wire or trace) embedded within the PCB 318. In various implementations, the haptic coil 340 may be embedded within the PCB 318 (as shown) or bonded to an exterior surface of the PCB 318. Rapidly oscillating a current direction in the haptic coil 340 causes a rapidly shifting x-y plane forces on the PCB 318 caused by the magnet 338, as illustrated by arrow 342. This movement is referred to herein as haptic feedback, which is experienced as the rapid acceleration and deceleration (e.g., characterized herein as peak-to-peak acceleration) and change of direction of movement of the PCB 318 and the associated touch interface 320 with reference to the frame 316.

The accelerometer 304 is used to detect the peak-to-peak acceleration of the haptic trackpad 302 in real-time. More specifically, peak-to-peak acceleration (or PTP acceleration) is the difference between maximum positive and maximum negative amplitudes of a waveform describing the haptic acceleration of the PCB 318 with reference to the frame 316 of the haptic trackpad 302. The accelerometer 304 may feed acceleration data to a microcontroller unit (MCU) 344, which calibrates the trackpad 302 initially or periodically and/or actively controls the haptic trackpad 302 during its usage over time and total lifespan (e.g., using a control loop, as further discussed below). Further, the acceleration data may be used to introduce more features to the trackpad 302 in order to provide a consistent and therefore improved click experience for the user.

Additionally, the haptic trackpad 302 may include a current sensor 346 (e.g., a discrete sensor attached to the PCB 318 or a sensor integrated into the MCU 344 or other PCB componentry) that may be used by the MCU 344 in conjunction with the data from the accelerometer 304 to calibrate and/or actively control the haptic trackpad 302. For example, the current sensor 346 may measure the actual current running through the haptic coil 340 for a haptic event and the MCU 344 may adjust power applied to the haptic coil 340 for the next haptic event to achieve a target for the current running through the haptic coil 340.

XYZ coordinates are shown and described to illustrate directional features of the disclosed technology. Other coordinate systems may also be used with different orientations with similar effect. In various implementations, the haptic trackpad 302 may be physically and/or communicatively coupled to a variety of computing devices, such as a tablet computer, a laptop computer, a personal computer, a gaming device, a smart phone, or any other discrete device that carries out one or more specific sets of arithmetic and/or logical operations. Further, features of the haptic trackpad 302, including the accelerometer 304, may be applied to a haptic push button with a touch interface used for any practical application.

Figure 4:
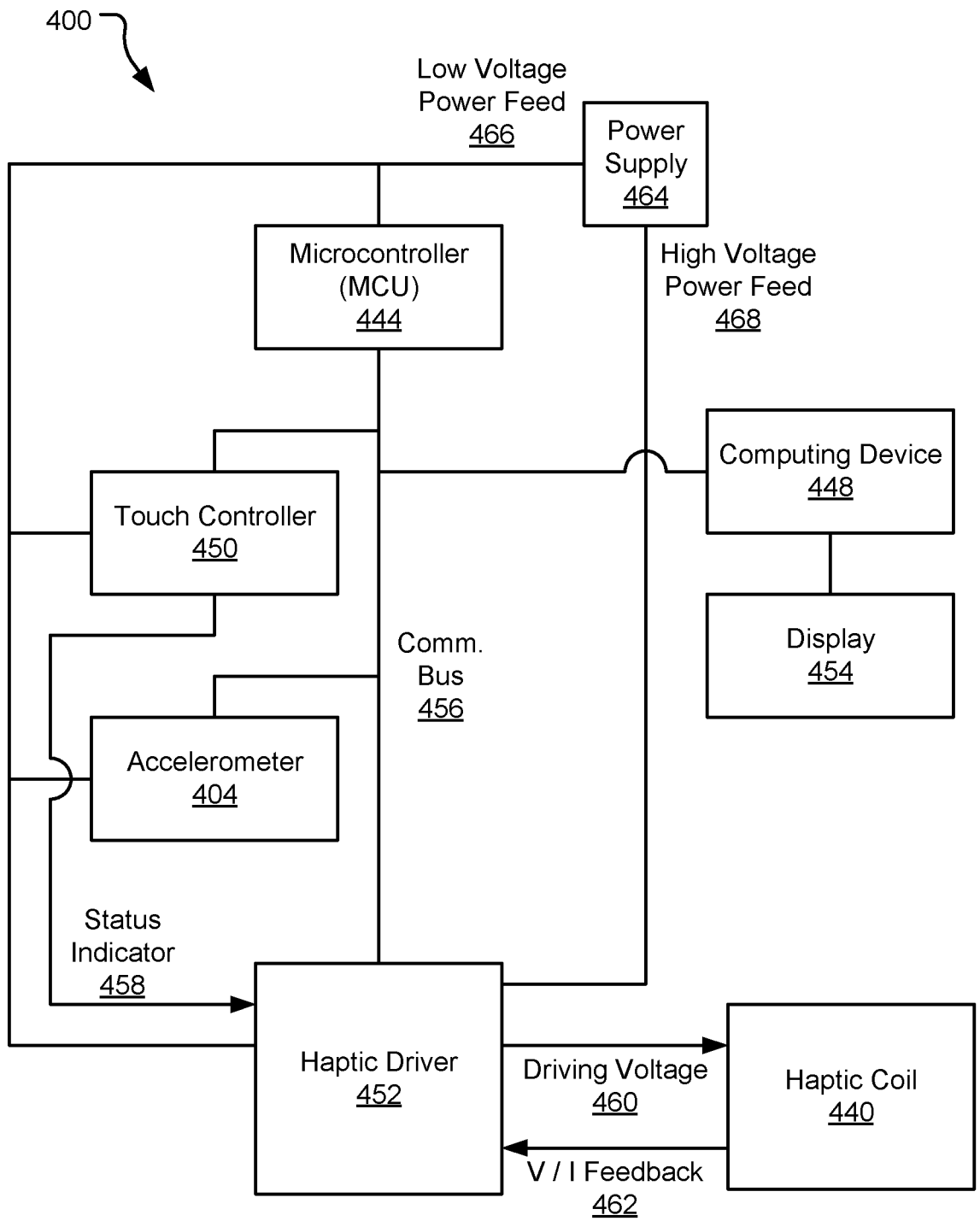
FIG. 4 illustrates an example electrical architecture for a haptic trackpad using active control and/or calibration according to the presently disclosed technology.

FIG. 4 illustrates an example electrical architecture 400 for a haptic trackpad (e.g., haptic trackpads 202 and 302 of FIGS. 2 and 3, respectively) using active control and/or calibration according to the presently disclosed technology. The haptic trackpad converts physical user inputs, into corresponding electrical signals that may be interpreted by a computing device 448 (e.g., a tablet computer, a laptop computer, a personal computer, a gaming device, a smart phone, or any other discrete device that carries out one or more specific sets of arithmetic and/or logical operations). The haptic trackpad also provides haptic feedback to the user. The haptic trackpad is made up of a printed circuit board (PCB) (not shown, see e.g., PCBs 218 and 318 of FIGS. 2 and 3, respectively) with a touch interface (not shown, see e.g., touch interfaces 220 and 320 of FIGS. 2 and 3, respectively) mounted thereon. Some or all of the electronic components of the haptic trackpad illustrated in FIG. 4 and described in detail below are mounted on or incorporated within the haptic trackpad PCB.

A touch controller 450 captures user inputs on the haptic trackpad and sends a signal representing the user's inputs to a haptic microcontroller 444 for processing and output to the computing device 448 over a communication bus 456 (e.g., an inter-integrated circuit (FC connection). The computing device 448 may use the signal received from the haptic microcontroller 444 for user inputs to the computing device 448 and/or rendering on an associated display 454. Once the touch controller 450 detects a click trigger event on the haptic trackpad, it sends a status indicator 458 (e.g., a flag through a general-purpose input/output (GPIO)) to haptic motor driver 452 for haptic actuation of a haptic element (not shown, see e.g., haptic elements 212 and 312 of FIGS. 2 and 3, respectively) of the haptic trackpad.

The haptic driver 452 (e.g., a H-bridge motor driver or a microcontroller integrated H-bridge) drives a haptic coil 440 with a driving voltage 460 having an alternating voltage polarity. In various implementations, the haptic driver 452 includes a current sensor to measure the current across the haptic driver 452 and a voltage sensor to protect the haptic driver 452 in the event of an adverse short condition, both illustrates as voltage (V)/current (I) feedback 462. The haptic driver 452 powers the haptic coil 440 to provide haptic feedback indicating a click upon a user's press and/or release event on the haptic trackpad.

The accelerometer 404 measures touchpad X/Y/Z directional acceleration during haptic actuation and sends its data to the haptic microcontroller 444 via the communication bus 456. The haptic microcontroller 444 uses inputs of data from the accelerometer 404 and the touch controller 450 to control operation of the haptic driver 452, also over the communication bus 456, particularly according to an active control and/or calibration process, as further described in detail below.

Power supply 464 powers various components of the electrical architecture 400. The haptic microcontroller 444, the touch controller 450, and the accelerometer 404 are all powered by the power supply 464 at a relatively low voltage (e.g., 1.8V-3.3V) for digital logic, as illustrated by low voltage power feed 466. The haptic driver 452 and the haptic coil 440 are powered by the power supply 464 at a relatively high voltage (e.g., 5V-12V), as illustrated by high voltage power feed 468. In various implementations, the computing device 448 may also be powered by the power supply 464, or another power supply.

In various implementations, the haptic microcontroller 444 implements an advanced haptic control scheme, which uses the current sensor embedded within the haptic driver 452 to fine tune the current driven through the haptic coil 440 for optimal haptic feedback control. Further, the accelerometer 404 may also directly connect to the haptic driver 452 via the communication bus 456 to enable the advanced haptic control scheme to be directly deployed by the haptic driver 452 (rather than through the haptic microcontroller 444) for a faster response time of the haptic feedback control.

Figure 5:
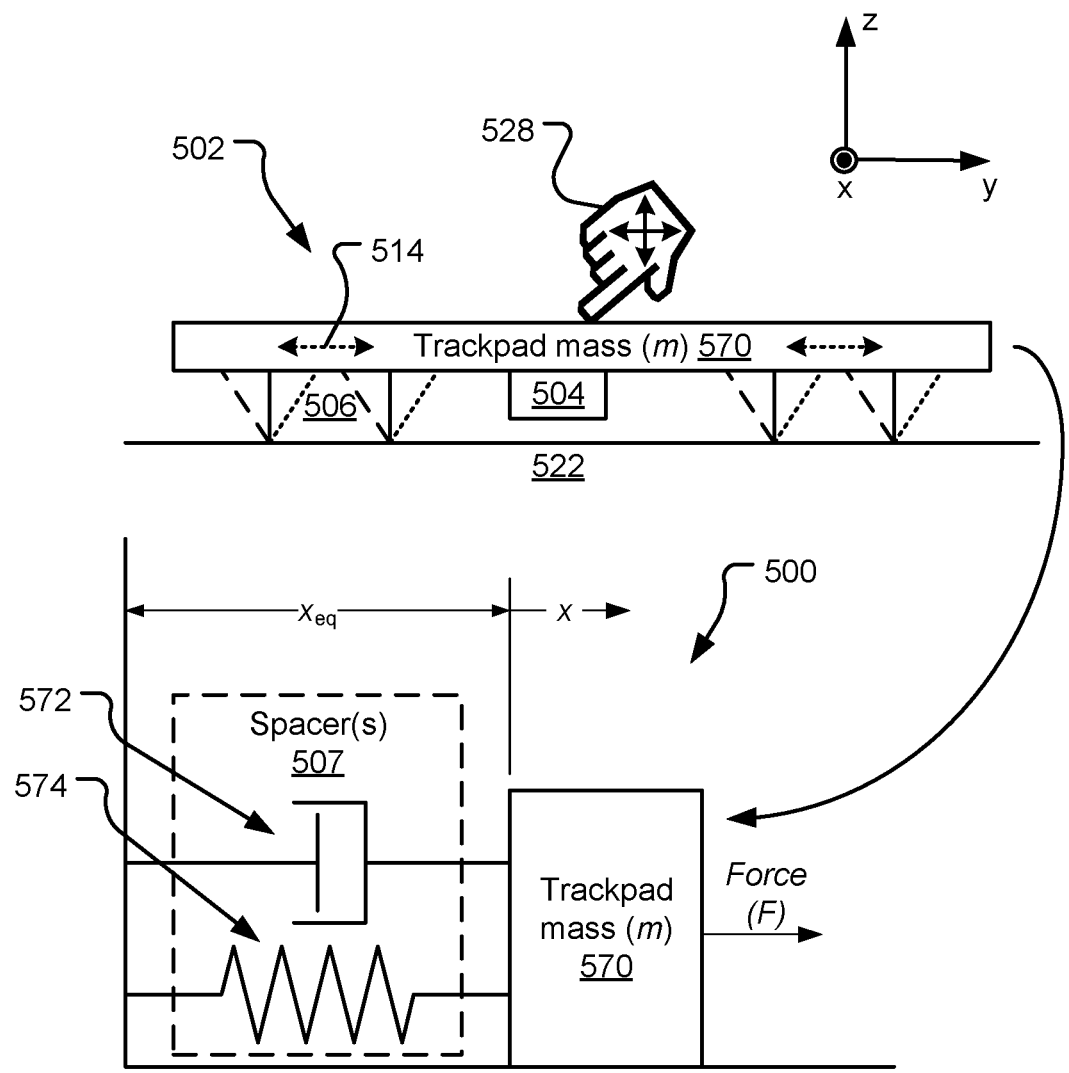
FIG. 5 illustrates a model of x-y plane motion of an example haptic trackpad tracked using an accelerometer according to the presently disclosed technology.

FIG. 5 illustrates a model 500 of x-y plane motion of an example haptic trackpad 502 tracked using an accelerometer 504 according to the presently disclosed technology. The haptic trackpad 502 converts physical user input, illustrated as applied by user's hand 528, into corresponding electrical signals that may be interpreted by a computing device (not shown). The haptic trackpad 502 also provides haptic feedback to the user via the user's hand 528.

The haptic trackpad 502 is made up of a printed circuit board (PCB) with a touch interface (e.g., a mylar or glass layer) mounted thereon. The PCB detects location, size, and motion of the user's touch inputs on the touch interface and the PCB converts the location, size, and motion of the user's touch inputs into an electronic signal that can be interpreted by the computing device. The PCB and the associated touch interface are attached to a mounting plate 522 via an array of spaced resiliently deflectable spacers (e.g., resiliently deflectable spacer 506). The resiliently deflectable spacers support the PCB in a spaced relationship with the mounting plate 522 in a z-direction but permit compliance in an x-y plane so that the PCB and the associated touch interface may selectively vibrate to provide haptic feedback to the user.

A combined mass of the PCB, the touch interface, the accelerometer 504, the user's hand 528, and any other componentry attached to the PCB and suspended from the mounting plate 522 using the resiliently deflectable spacers is referred to herein as the trackpad mass (m) 570. As noted above, the resiliently deflectable spacers are compliant in the x-y plane, as illustrated by dotted and dashed line representations of the resiliently deflectable spacers being deformed under shear forces and dotted arrows (e.g., arrow 514).

The trackpad mass (m) 570 is also shown in the model 500, and the combined one or more resiliently deflectable spacers 507 is represented by dashpot (or damper) 572 and spring 574 in terms of their effect on movement of the trackpad mass (m) 570 under an applied external force (F). The haptic trackpad 502 vibrating laterally (within the x-y place, either linearly or rotationally) can be simplified and modeled as the spring-damper-mass vibration model 500 that is actuated using the external force (F). Suspended components of the haptic trackpad 502 in total are considered a rigid body with trackpad mass (m) 570. $x_{eq}$ is considered a steady-state position of the haptic trackpad 502, while x represents displacement of the haptic trackpad 502 within the x-y plane when under the external force (F).

When the external force (F) is applied, the resiliently deflectable spacers 507 mounted between the PCB and the mounting plate 522 will shear and permit the haptic trackpad 502 to oscillate within the x-y plane, a motion that is modeled by the depicted dashpot 572 and spring 574, having damping constant c and spring constant K, respectively. The external force (F) is generated electromagnetically from a direct drive actuator (not shown, see e.g., haptic driver 452 of FIG. 4), which applies the external force (F) using a current-carrying conductor (not shown, see e.g., haptic coil 440 of FIG. 4) within a magnetic field.

A waveform of the current going through the haptic coil is defined herein as W(t), where t is time and W(t) is between 0 to 1. The waveform may be preset by design, (e.g., sine, half sine, step, etc). The external force (F), according to Lorentz force, is derived as $F=i*(N*l)*B$, where i is current through the haptic coil, N is the total loops of the haptic coil, l is the length of the haptic coil in and perpendicular to the magnetic field, and B is the magnetic flux density that is perpendicular to the coil.

As a sum of force in the system, the differential equation can be expressed as $mX''+cX'+kX=l*N*B*i*W(t)$ (equation (1)), with x(t) defined as displacement of the moving haptic trackpad 502, X'(t) as velocity of the moving haptic trackpad 502, and X''(t) as acceleration of the moving haptic trackpad 502 (what the accelerometer 504 measures), where m, l, N, B, are designed parameters in the model 500 and c and k are also designed parameter and can be measured and determined by mechanical testing of the haptic trackpad 502. Parameters G and w are used to control the actuation force, each of which is a gain value (e.g., 0 to 1) for the current and input waveform frequency, which can be set and used to control the acceleration of the haptic trackpad 502. This model can be expressed as $mX''+cX'+kX=l*N*B*G*i*W(wt)$ (equation (2)), with G and w as controlled variables.

G and W(wt) break the current i into a time dependent function, and current through the haptic coil is changed by adjusting G and w. With the accelerometer 504 on haptic trackpad 502, equation 2 (above) can be used as a feedback control loop, with parameters G and w being modified to control acceleration of the moving haptic trackpad 502 (X''(t)) against a target acceleration iteratively over time. Specifically, the current gain G and the input waveform frequency w change the touchpad acceleration (X''(t)), while the touchpad acceleration (X''(t)) is fed back to adjust G and w to achieve the target acceleration.

Figure 6:
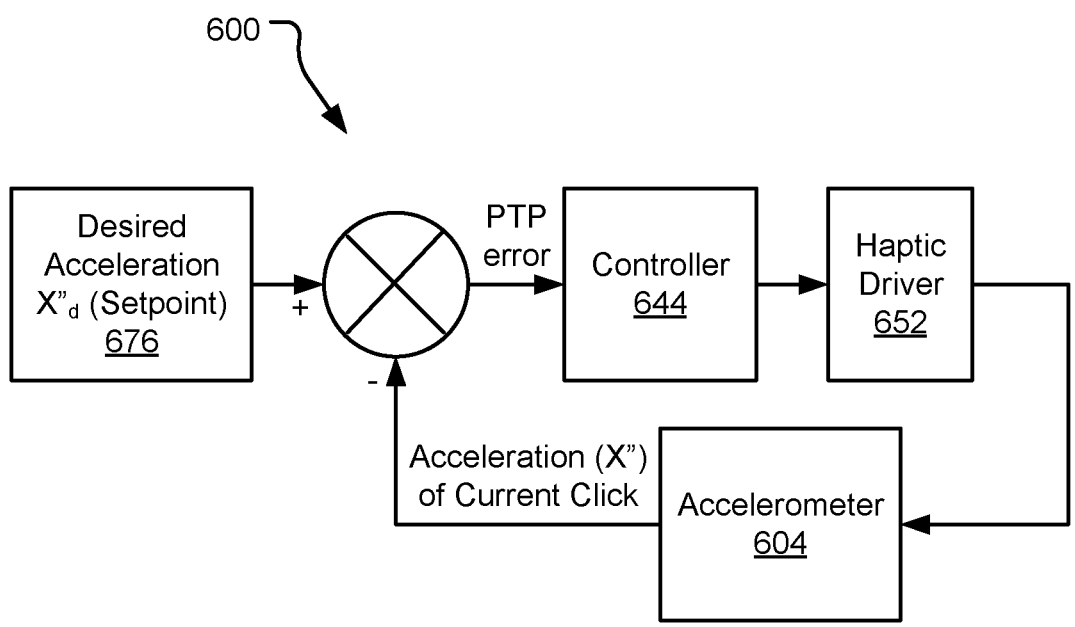
FIG. 6 illustrates an example control system for a haptic trackpad with an accelerometer using active control and/or calibration according to the presently disclosed technology.

FIG. 6 illustrates an example control system 600 for a haptic trackpad with an accelerometer 604 using active control and/or calibration according to the presently disclosed technology. The haptic trackpad converts physical user input into corresponding electrical signals that may be interpreted by a computing device. The haptic trackpad also provides haptic feedback to the user.

The control system 600 actively adjusts the trackpad haptic feedback (measured and expressed as peak-to-peak acceleration). A desired peak-to-peak (PTP) acceleration $(X''_d)$ 676 is pre-set as input to the control system 600. The accelerometer 604 on the haptic trackpad measures the PTP acceleration of the last haptic trackpad click in its vibration axis, and then calculates a difference between the last measured PTP acceleration and the desired PTP acceleration, which is referred to herein as a PTP error.

Controller 644, which may be implemented in hardware and/or software, takes the PTP error as an input, and converts it to the input current to be sent through a haptic coil via haptic driver 652 by adjusting the current gain G of equation (2), discussed above. For example, a Proportional-Integral-Derivative (PID) controller may be used as the controller 644. The choice of controller 644 is flexible and could be linear or non-linear and tuned for maximum effectiveness.

The controller 644 outputs the expected input current to the haptic driver 652, then the haptic driver 652 outputs a voltage in pulse width modulation (PWM) that can generate the expected current in the haptic coil when there is a click event trigger. The click event trigger will actuate the haptic trackpad to vibrate and generate haptic feedback to meet the desired acceleration $(X''_d)$ setpoint 676. While the haptic trackpad is actuating with the controlled input current, the accelerometer 604 will capture the acceleration of the current haptic click and feed that measurement back to the controller 644 to calculate an expected current for the next click. The process continues in an iterative closed-loop fashion to update the voltage output from the haptic driver 652 to the haptic coil to achieve the desired acceleration $(X''_d)$ setpoint 676. The various implementation, the control system 600 may be considered a closed feedback loop.

Figure 7:
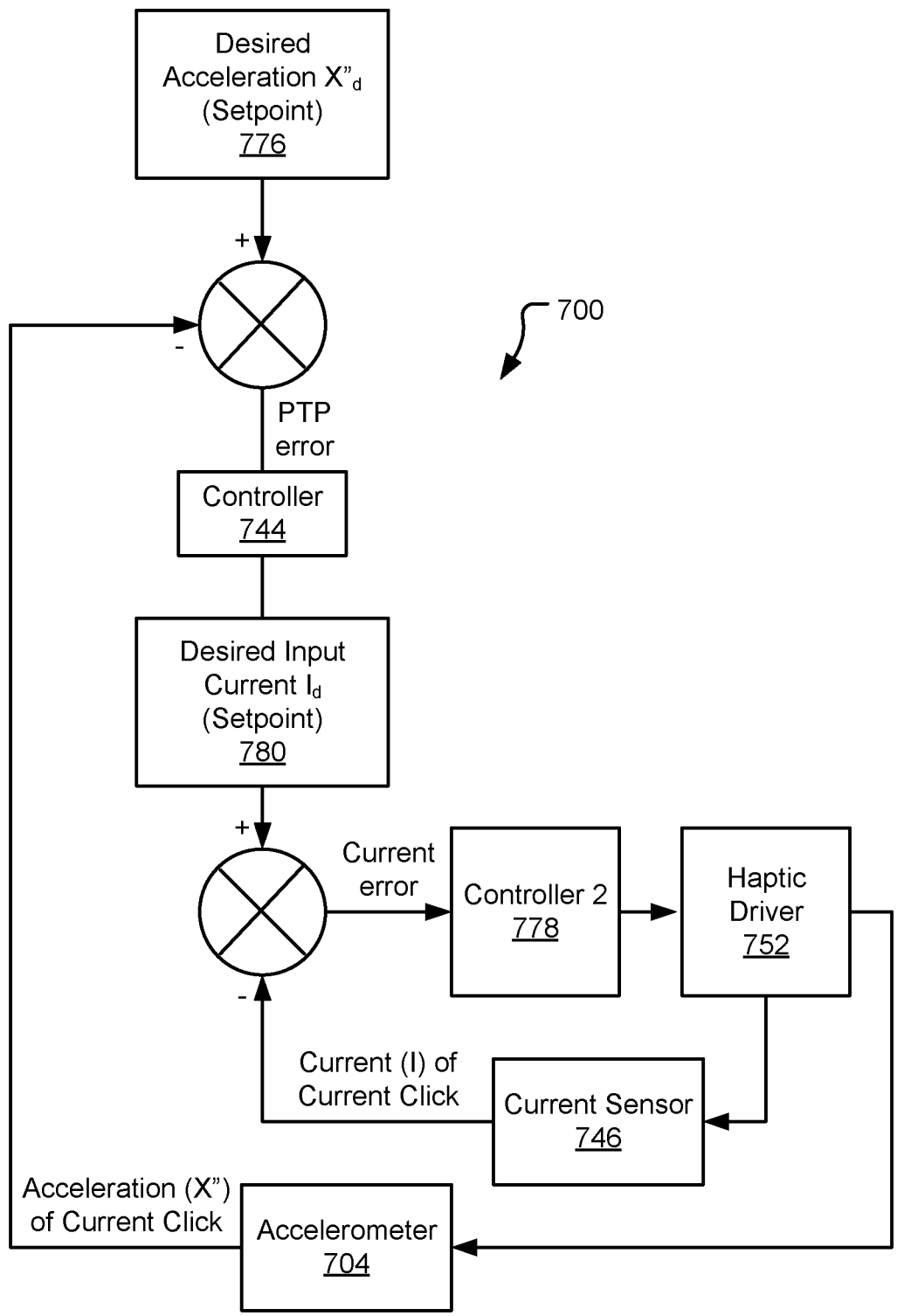
FIG. 7 illustrates another example control system for a haptic trackpad with an accelerometer using active control and/or calibration according to the presently disclosed technology.

FIG. 7 illustrates another example control system 700 for a haptic trackpad with an accelerometer 704 using active control and/or calibration according to the presently disclosed technology. The haptic trackpad converts physical user input into corresponding electrical signals that may be interpreted by a computing device. The haptic trackpad also provides haptic feedback to the user.

The control system 700 actively adjusts the trackpad haptic feedback (measured and expressed as peak-to-peak acceleration). A desired peak-to-peak (PTP) acceleration $(X''_d)$ 776 is pre-set as input to the control system 700. The accelerometer 704 on the haptic trackpad measures the PTP acceleration of the last haptic trackpad click in its vibration axis, and then calculates a difference between the last measured PTP acceleration and the desired PTP acceleration, which is referred to herein as a PTP error.

Controller 744, which may be implemented in hardware and/or software, takes the PTP error as an input, and converts it to the input current to be sent through a haptic coil via haptic driver 752 by adjusting the current gain G of equation (2), discussed above. For example, a Proportional-Integral-Derivative (PID) controller may be used as the controller 744. The choice of controller 744 is flexible and could be linear or non-linear and tuned for maximum effectiveness.

The controller 744 outputs the expected input current to the haptic driver 752, then the haptic driver 752 outputs a voltage in pulse width modulation (PWM) that can generate the expected current in the haptic coil when there is a click event trigger. The click event trigger will actuate the haptic trackpad to vibrate and generate haptic feedback to meet the desired acceleration ($X''_d$) setpoint 776. While the haptic trackpad is actuating with the controlled input current, the accelerometer 704 will capture the acceleration of the current haptic click and feed that measurement back to the controller 744 to calculate an expected current for the next click. The process continues in an iterative closed-loop fashion to update the voltage output from the haptic driver 752 to the haptic coil to achieve the desired acceleration ($X''_d$) setpoint 776.

As compared to the control system 600 of FIG. 6, the control system 700 uses an additional feedback loop using current sensor 746 to fine tune the current across the haptic coil for optimal haptic feedback control additional to the control using the accelerometer 704. The additional current feedback is used to control the voltage applied by the haptic driver 752 by measuring the current across the haptic coil to ensure the actual current is matching a desired input current $I_d$ (setpoint) 780 calculated using the controller 744. A second controller 778 takes the error between the desired input current $I_d$ (setpoint) 780 and actual current through the haptic coil measured by the current sensor 746 and outputs a tuned voltage to achieve the desired input current $I_d$ (setpoint) 780 to the haptic driver 752. The haptic trackpad will be actuated with this tuned input voltage/current, and the acceleration feedback data is used to sense if the desired haptic actuation trackpad feedback has been reached. The various implementation, the control system 700 may be considered a closed feedback loop.

Figure 8:
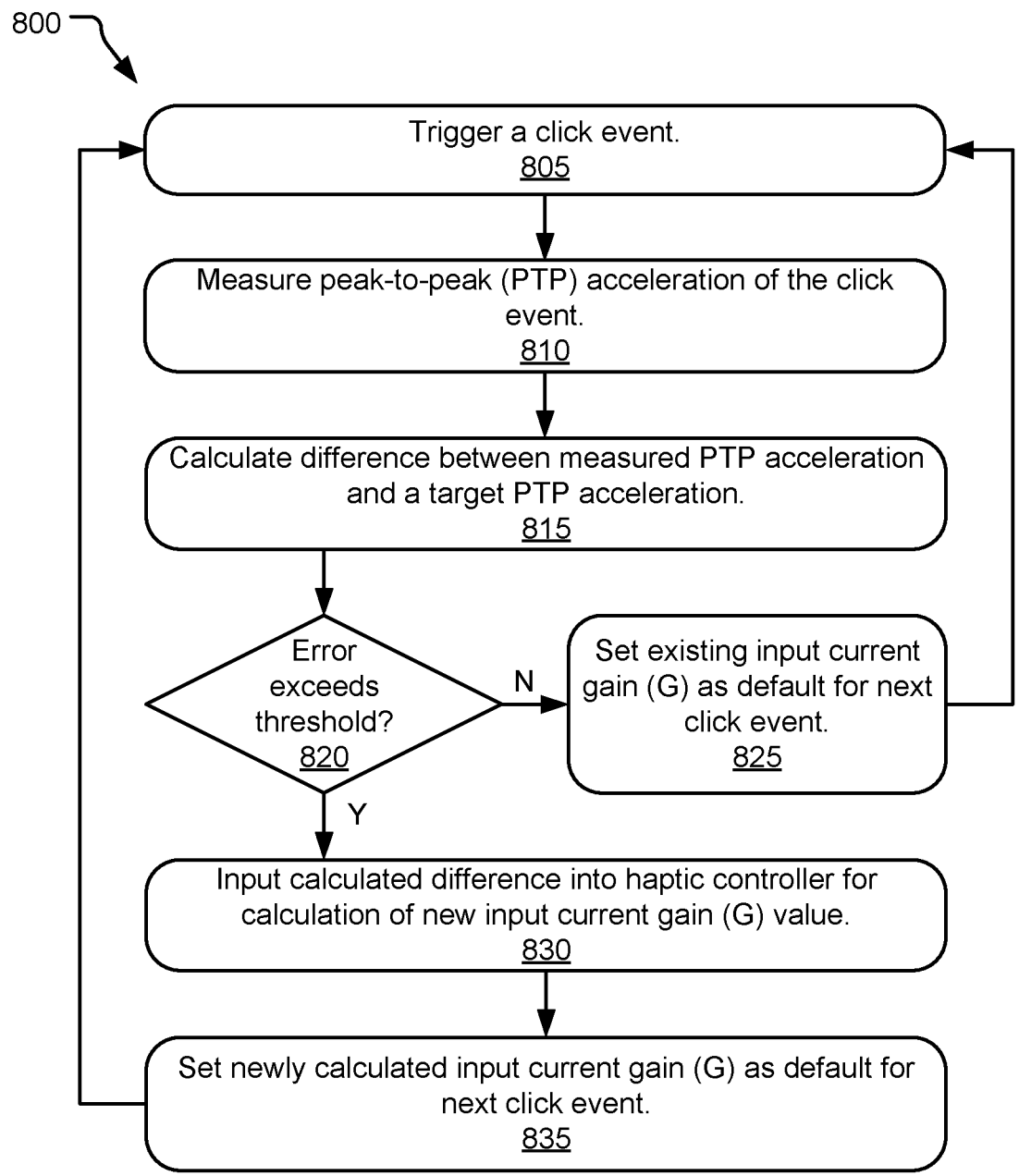
FIG. 8 illustrates example operations for running an active control system on a haptic trackpad with an accelerometer.

FIG. 8 illustrates example operations 800 for running an active control system on a haptic trackpad with an accelerometer. During normal haptic trackpad usage, a control system such as that illustrated in FIGS. 6-7 and described above may be used to implement the operation 800 for haptic feedback active tuning to get consistent peak-to-peak acceleration. Generally, operations 800 take click acceleration of a previous click, adjust input current via a designed controller, and output to an actuator for touchpad haptic click to meet the target acceleration. By running such a feedback loop, the touchpad haptic feedback will be tuned on every click.

A triggering operation 805 triggers a click event. For example, a user may depress the haptic trackpad sufficiently to indicate the user's desire to trigger the click event. A measuring operation 810 measures peak-to-peak (PTP) acceleration of the click event. In various implementations, the measuring operation 810 is accomplished using an accelerometer mounted to a haptic trackpad PCB. A calculation operation 815 calculates a difference between the measured PTP acceleration and a target PTP acceleration. In various implementations, the target PTP acceleration is predefined to provide a desired haptic experience to the user.

A decision operation 820 determines if the calculated difference (error) between the measured PTP acceleration and a target PTP acceleration exceeds a threshold. In various implementations, the threshold is 0 m/s². If the calculated difference between the measured PTP acceleration and a target PTP acceleration does not exceed the threshold, setting operation 825 sets the existing input current gain (G) as the default for the next click event. The active control system then waits for the next click event to be triggered.

If the calculated difference between the measured PTP acceleration and a target PTP acceleration exceeds the threshold, inputting operation 830 inputs the calculated difference into a haptic controller or calculation of a new input current gain (G) value. The new input current gain (G) value adjusts an output of the haptic element to change the measured peak-to-peak acceleration to match the target peak-to-peak acceleration of the oscillation of the PCB. A setting operation 835 sets the newly calculated input current gain (G) as the default for the next click event. The active control system then waits for the next click event to be triggered.

Figure 9:
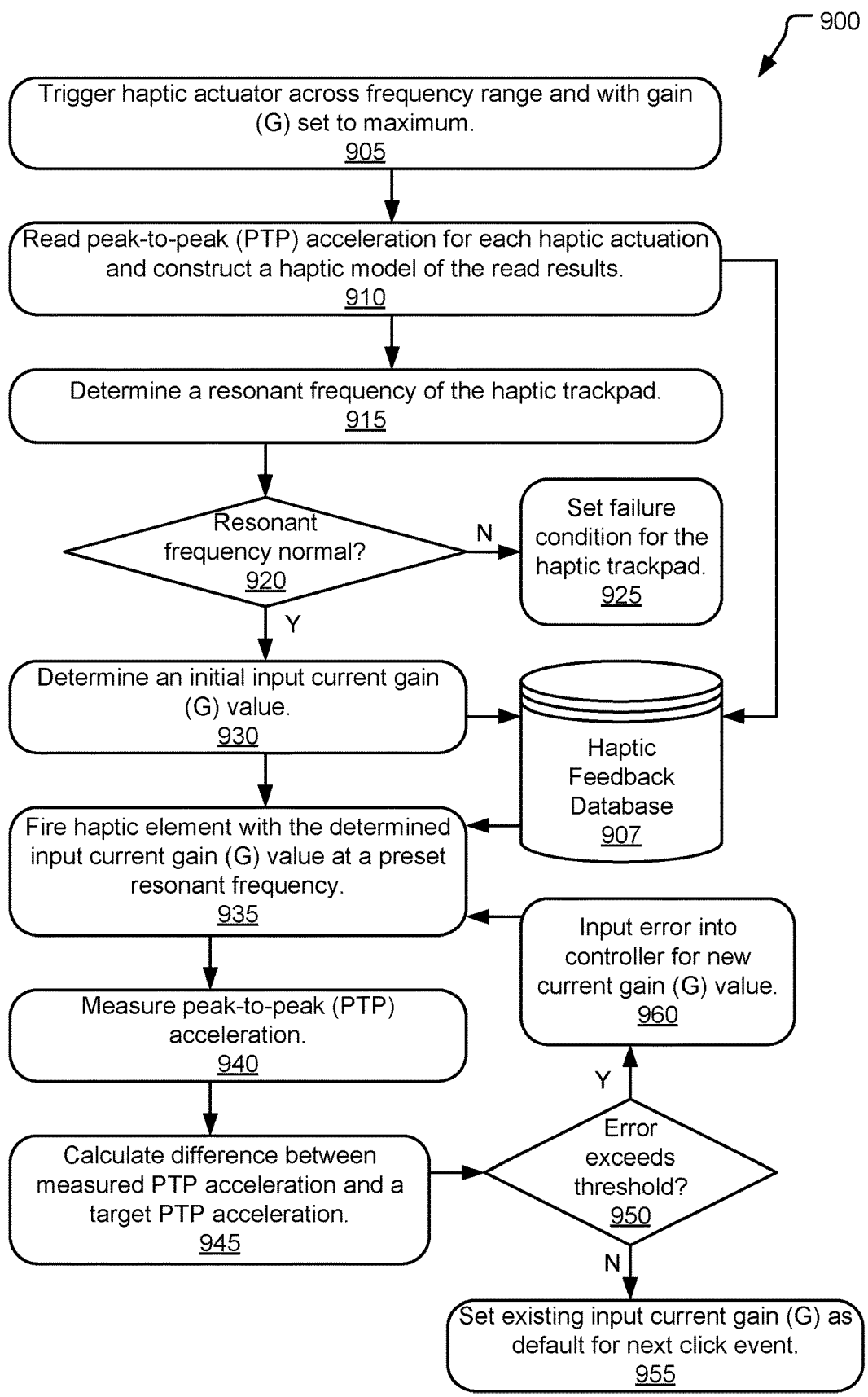
FIG. 9 illustrates example operations for running an active calibration system on a haptic trackpad with an accelerometer.

FIG. 9 illustrates example operations 900 for running an active calibration system on a haptic trackpad with an accelerometer. The calibration operations 900 may be used to calibrate each individual haptic trackpad. More specifically, the calibration operations 900 may be used to test for any abnormal conditions on the haptic trackpad and configure its haptic actuation strength according to its own mechanical properties and performance, to meet a target peak-to-peak (PTP) acceleration.

In some implementations, the calibration operations 900 are used at a point and time of manufacture of the haptic trackpad as a part of its commissioning. In other implementations, the calibration operations 900 may be used to re-calibrate the haptic trackpad periodically over its lifespan. For further example, when the haptic trackpad in a user's hand, the user may trigger the calibration operations 900 if any abnormal noticed, such as mechanical wear, material degradation, and environment changes. Similarly, if a resonance frequency of the haptic trackpad is beyond an expected range, the user may be notified and prompted to check with store for abnormal, such as debris inside gaps between touchpad glass and chassis. The calibration operations 900 may further be used to build a haptic feedback database 907, which represents the haptic trackpad's mechanical properties. A technical effect of the haptic feedback database 907 is that it stores data specific to the haptic trackpad, based on the calibration operations 900. As manufacturing tolerances, wear, and age, for example, may vary between similarly designed and manufactured haptic trackpads, the haptic feedback database 907 may be used to compensate for those variances.

A triggering operation 905 triggers a haptic actuator within the haptic trackpad multiple times across a spectrum of input frequencies between frequency minimum and a frequency maximum values and at a maximum gain (G) value. A reading operation 910 reads PTP acceleration for each haptic actuation and constructs a model of the read results, which is stored within the haptic feedback database 907. A determining operation 915 determines a resonant frequency of the haptic trackpad by determining a maximum PTP acceleration across the spectrum of input frequencies, using the same maximum gain (G) value.

A decision operation 920 determines if the determined resonant frequency is within a normal range for the haptic trackpad. If it is not, a setting operation 925 sets a failure condition for the haptic trackpad. In some implementations, this may mean that the haptic trackpad is sent for failure analysis or repair. In other implementations, this means that the notification is sent to the user to have the haptic trackpad brought in for repair. If the decision operation 920 determines that the determined resonant frequency is within a normal range for the haptic trackpad, a determining operation 930 determines an initial input current gain (G) for the haptic trackpad. The initial input current gain (G) is stored within the haptic feedback database 907.

A firing operation 935 fires the haptic element within the haptic trackpad with the determine input current gain (G) and at a preset resonant frequency for the haptic trackpad, as retrieved from the haptic feedback database 907. A measuring operation 940 measures peak-to-peak (PTP) acceleration of the firing event. In various implementations, the measuring operation 940 is accomplished using an accelerometer mounted to a haptic trackpad PCB. A calculation operation 945 calculates a difference between the measured PTP acceleration and a target PTP acceleration. In various implementations, the target PTP acceleration is predefined to provide a desired haptic experience to the user.

A decision operation 950 determines if the calculated difference (error) between the measured PTP acceleration and a target PTP acceleration exceeds a threshold. In various implementations, the threshold is 0 m/s$^2$. If the calculated difference between the measured PTP acceleration and a target PTP acceleration does not exceed the threshold, setting operation 955 sets the existing input current gain (G) as the default for the first click event. The active calibration process is then complete, and an active control system then waits for the first click event to be triggered. If the calculated difference between the measured PTP acceleration and a target PTP acceleration exceeds the threshold, inputting operation 960 inputs the calculated difference into a haptic controller for calculation of a new input current gain (G) value. The firing operation 935 is then repeated with the new input current gain (G) value.

Figure 10:
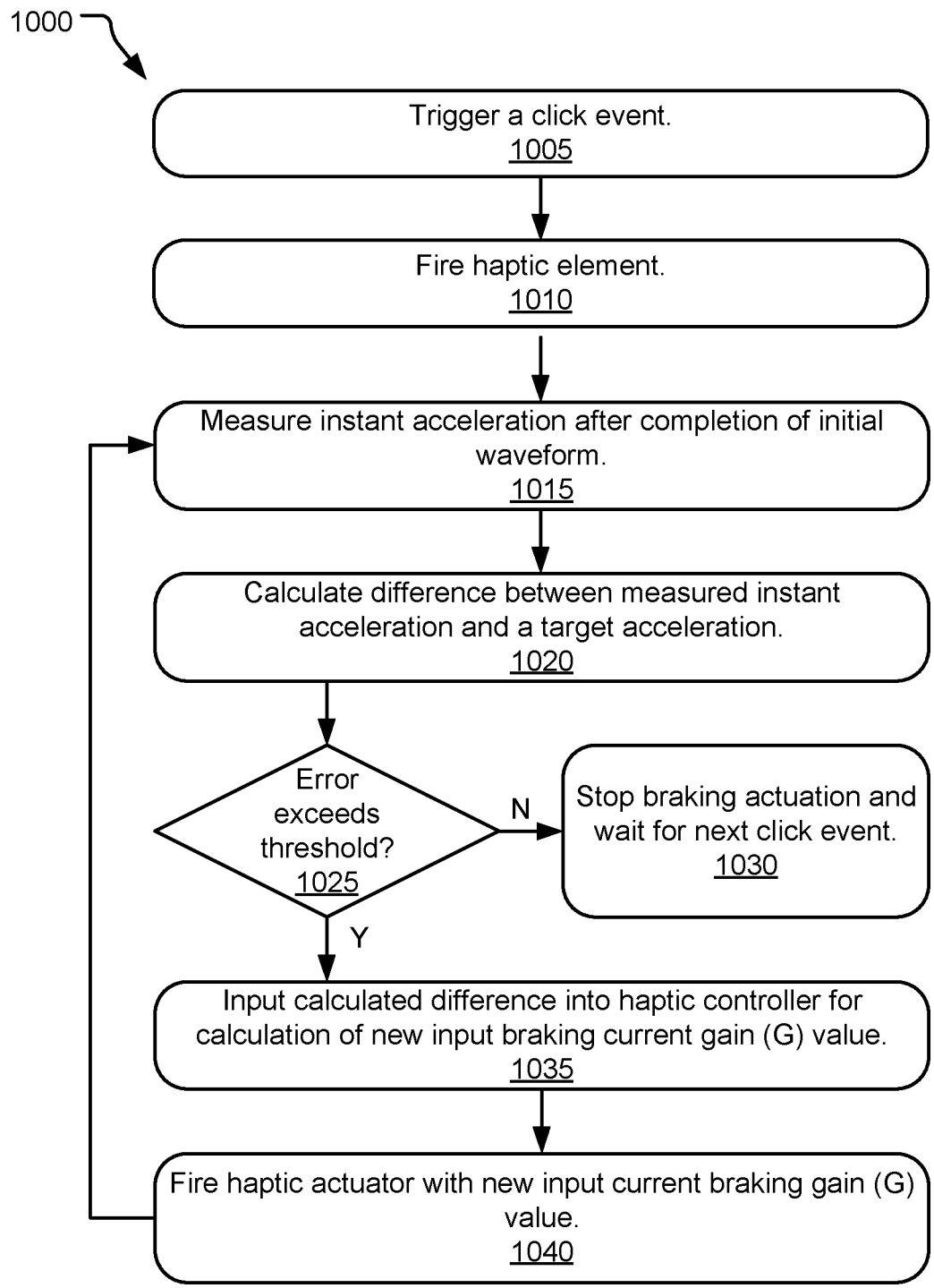
FIG. 10 illustrates example operations for running an active braking system on a haptic trackpad with an accelerometer.

FIG. 10 illustrates example operations 1000 for running an active braking system on a haptic trackpad with an accelerometer. The braking operations 1010 may be used to actively brake a haptic waveform following its first full period of oscillation. More specifically, the actively controlled braking operations 1010 are triggered after a haptic actuation click, to stop redundant free oscillation of the haptic trackpad after the click actuation, in order to offer a cleaner and quieter haptic click experience to the user.

A triggering operation 1005 triggers a click event. For example, a user may depress the haptic trackpad sufficiently to indicate the user's desire to trigger the click event. A firing operation 1010 fires the haptic element within the haptic trackpad by generating an input current waveform for a haptic element within the haptic trackpad. After an initial full period of the input current waveform is completed at a peak-to-peak acceleration, a measuring operation 1015 measures an instant acceleration of residual oscillation of the haptic trackpad. The technical benefit of measuring instant acceleration following peak-to-peak acceleration is that the following braking actuation can be timed and applied in magnitude to reduce or negate the instant acceleration. In various implementations, the measuring operation 1015 is accomplished using an accelerometer mounted to a haptic trackpad PCB.

A calculation operation 1020 calculates a difference between the measured instant acceleration and a target acceleration. In various implementations, the target acceleration for braking the haptic trackpad is 0 m/s$^2$. A decision operation 1025 determines if the calculated difference (error) between the measured instant acceleration and the target acceleration exceeds a threshold. In various implementations, the threshold is also 0 m/s$^2$. If the calculated difference between the measured instant acceleration and the target acceleration does not exceed the threshold, stopping operation 1030 stops braking actuation of the haptic element. The braking control system then waits for the next click event to be triggered.

If the calculated difference between the measured instant acceleration and the target acceleration exceeds the threshold, inputting operation 1035 inputs the calculated difference into a haptic controller for calculation of a new input braking current gain (G) value. A firing operation 1040 fires the haptic element with the newly calculated input braking current gain (G) value, thereby applying instant braking force to the haptic element. The measuring operation 1015 is then repeated to determine if further braking operations are necessary.

In some implementations, the braking operations 1010 immediately follow active control operations, such as active control operations 800 of FIG. 8. After the controlled haptic actuation reaches a desired peak-to-peak acceleration on the haptic trackpad, the accelerometer continues measuring the instant acceleration, and the controller calculates an instant error between desired braking acceleration, which may be set at 0 m/s$^2$. The haptic controller, or a dedicated braking controller (e.g., a PID) takes the error as an input and converts the input current to the haptic driver. The haptic driver will apply a braking waveform (e.g., a similar waveform as the driving waveform, but reversed in polarity) to the haptic coil in order to stop the free oscillation of the haptic trackpad.

In an example implementation, an input current may be characterized as a sinusoidal waveform running for a singular PTP period. However, the residual oscillation of the haptic trackpad without active braking after a PTP acceleration point can be characterized as an underdamped sinusoidal oscillation (e.g., sin(wt) with G set to 1) that continues beyond the singular PTP period and that substantially ceases after approximately 0.035 seconds following initial actuation of the haptic element. The haptic trackpad reaches peak-to-peak acceleration after the input waveform, and then undergoes an under-damped oscillation. The residual redundant vibration of the haptic trackpad can be felt by the user as is gradually fades away, which is not clean in terms of the user experience and causes undesired acoustics.

The active braking waveform counteracts this residual under-damped oscillation to actively remove it. In one example implementation, a braking controller is implemented as a Proportional-Derivative (PD) controller. After reaching the desired peak-to-peak, the PD controller acceleration applies a input braking current waveform that is an inverse of the residual redundant vibration waveform and quickly reduces the residual redundant vibration of the haptic trackpad to 0 m/s$^2$ with only one measurable full oscillation following the PTP acceleration. The haptic trackpad reaches substantially 0 m/s$^2$ at approximately 0.02 seconds and stays at 0 m/s$^2$ as a steady-state. This faster transient state may provide better haptic click experience for the user than allowing the haptic trackpad to naturally reach steady-state within active braking.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language. Unless otherwise explicitly defined, dimensions described as substantially or approximately herein are +/−10% of the values provided.

Implementations disclosed herein provide a trackpad comprising a printed circuit board (PCB) including a touch interface, a haptic element fixedly attached to the PCB to selectively oscillate the PCB, an accelerometer fixedly attached to the PCB to measure peak-to-peak acceleration of the oscillation of the PCB, and a microcontroller. The microcontroller compares the measured peak-to-peak acceleration with a target peak-to-peak acceleration of the oscillation of the PCB and adjusts an output of the haptic element to change the measured peak-to-peak acceleration to match the target peak-to-peak acceleration of the oscillation of the PCB.

Implementations disclosed herein provide a trackpad further comprising a frame, a resiliently deflectable spacer oriented between the frame and the PCB, the resiliently deflectable spacer to permit shear displacement of the PCB with reference to the frame, and a spring connecting the resiliently deflectable spacer to the frame, the spring to permit compressive displacement of the PCB with reference to the frame.

Implementations disclosed herein provide a trackpad wherein the haptic element includes a haptic coil fixedly attached to the PCB and a magnet fixedly attached to the frame.

Implementations disclosed herein provide a trackpad further comprising a current sensor to measure current running through the haptic coil. The microcontroller further compares the measured current running through the haptic coil with a target current running through the haptic coil and adjusts a power applied to the haptic coil to change the measured current running through the haptic coil to substantially match the target current running through the haptic coil.

Implementations disclosed herein provide a trackpad further comprising a force sensor to detect the compressive displacement of the PCB with reference to the frame.

Implementations disclosed herein provide a trackpad wherein the spring cantilevers the PCB over a cavity in the frame.

Implementations disclosed herein provide a trackpad further comprising a haptic feedback database specific to the trackpad, wherein measured peak-to-peak accelerations of a series of haptic event oscillations, each associated with an oscillation frequency, are stored within the haptic feedback database.

Implementations disclosed herein provide a method for actively controlling a trackpad. The method comprises measuring peak-to-peak acceleration of a haptic event oscillation of a printed circuit board (PCB) including a touch interface using an accelerometer fixedly attached thereto, comparing the measured peak-to-peak acceleration with a target peak-to-peak acceleration of the oscillation of the PCB, and adjusting an output of a haptic element fixedly attached to the PCB to change the measured peak-to-peak acceleration to match the target peak-to-peak acceleration of the oscillation of the PCB.

Implementations disclosed herein provide a method wherein adjusting the output of the haptic element includes changing a gain factor for the input current of a next haptic event oscillation of the PCB.

Implementations disclosed herein provide a method further comprising measuring instant acceleration following completion of an initial waveform period of the haptic event oscillation of the PCB using the accelerometer fixedly attached thereto, comparing the measured instant acceleration with a target acceleration of the oscillation of the PCB, and adjusting an output of the haptic element to change the measured instant acceleration to match the target acceleration of the oscillation of the PCB.

Implementations disclosed herein provide a method wherein the target acceleration of the oscillation of the PCB is 0 m/s$^2$ and the adjustment operation is to achieve actively controlled braking of the oscillation of the PCB.

Implementations disclosed herein provide a method wherein the output of the haptic element is adjusted to an inverse of a residual oscillation waveform of the PCB.

Implementations disclosed herein provide a method wherein the haptic event is triggered for active calibration of the trackpad, and wherein adjusting the output of the haptic element includes setting an initial gain factor for the input current for the first haptic event oscillation of the PCB during normal use.

Implementations disclosed herein provide a method further comprising triggering the haptic element across a range of frequencies, measuring peak-to-peak acceleration of each haptic event oscillation associated with a frequency, determining a resonant frequency of the trackpad corresponding to a maximum peak-to-peak acceleration of the trackpad, and comparing the determined resonant frequency with a range of normal resonant frequencies for the trackpad.

Implementations disclosed herein provide a method further comprising storing the measured peak-to-peak acceleration of each haptic event oscillation associated with a frequency in a haptic feedback database specific to the trackpad.

Implementations disclosed herein provide a method further comprising determining an initial gain value for the trackpad and storing the initial gain value in the haptic feedback database specific to the trackpad.

Implementations disclosed herein provide a method wherein the measuring, comparing, and adjusting operations are performed in a closed feedback loop.

Implementations disclosed herein provide a haptic button comprising a frame, a printed circuit board (PCB), a resiliently deflectable spacer oriented between the frame and the PCB, the resiliently deflectable spacer to permit shear displacement of the PCB with reference to the frame, a haptic element fixedly attached to the PCB to selectively oscillate the PCB, an accelerometer fixedly attached to the PCB to measure peak-to-peak acceleration of the oscillation of the PCB, and a microcontroller. The microcontroller compares the measured peak-to-peak acceleration with a target peak-to-peak acceleration of the oscillation of the PCB and adjusts an output of the haptic element to change the measured peak-to-peak acceleration to match the target peak-to-peak acceleration of the oscillation of the PCB.

Implementations disclosed herein provide a haptic button wherein the haptic element includes a haptic coil fixedly attached to the PCB and a magnet fixedly attached to the frame.

Implementations disclosed herein provide a haptic button further comprising a current sensor to measure current running through the haptic coil, wherein the microcontroller compares the measured current running through the haptic coil with a target current running through the haptic coil, and adjusts a power applied to the haptic coil to change the measured current running through the haptic coil to match the target current running through the haptic coil.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A trackpad comprising:
a printed circuit board (PCB) including a touch interface;
a haptic element fixedly attached to the PCB to selectively oscillate the PCB;
an accelerometer fixedly attached to the PCB to measure peak-to-peak acceleration of the oscillation of the PCB;
a current sensor to measure current running through the haptic element; and
a microcontroller to actively calibrate the trackpad by:
triggering the haptic element across a range of frequencies;
measuring peak-to-peak acceleration of haptic event oscillations, each associated with a frequency;
determining a resonant frequency of the trackpad corresponding to a maximum peak-to-peak acceleration of the trackpad; and
comparing the determined resonant frequency with a range of normal resonant frequencies for the trackpad.

2. The trackpad of claim 1, further comprising:
a frame;
a resiliently deflectable spacer oriented between the frame and the PCB, the resiliently deflectable spacer to permit shear displacement of the PCB with reference to the frame; and
a spring connecting the resiliently deflectable spacer to the frame, the spring to permit compressive displacement of the PCB with reference to the frame.

3. The trackpad of claim 2, wherein the haptic element includes a haptic coil fixedly attached to the PCB and a magnet fixedly attached to the frame.

4. The trackpad of claim 2, further comprising:
a force sensor to detect the compressive displacement of the PCB with reference to the frame.

5. The trackpad of claim 2, wherein the spring cantilevers the PCB over a cavity in the frame.

6. The trackpad of claim 1, further comprising:
a haptic feedback database specific to the trackpad, wherein measured peak-to-peak accelerations of a series of haptic event oscillations, each associated with an oscillation frequency, are stored within the haptic feedback database.

7. The trackpad of claim 6, wherein the microcontroller is further to actively calibrate the trackpad by:
determining an initial gain value for the trackpad; and
storing the initial gain value in the haptic feedback database specific to the trackpad.

8. The trackpad of claim 7, wherein the microcontroller is further to actively control the trackpad by:
firing the haptic element using the determined initial gain value for the trackpad;
comparing measured peak-to-peak acceleration of the oscillation of the PCB using the determined initial gain value with a target peak-to-peak acceleration of the oscillation of the PCB;
adjusting an output of the haptic element to change the measured peak-to-peak acceleration to match the target peak-to-peak acceleration of the oscillation of the PCB in a first feedback loop;
comparing measured current running through the haptic element with a target current running through the haptic element; and
adjusting a power applied to the haptic element to change the measured current running through the haptic element to substantially match the target current running through the haptic element in a second feedback loop.

9. A method for actively calibrating a trackpad comprising:
triggering haptic event oscillations across a range of frequencies of a printed circuit board (PCB) including a touch interface using a haptic element fixedly attached to the PCB;
measuring peak-to-peak acceleration of haptic event oscillations using an accelerometer fixedly attached to the PCB, each haptic event oscillation associated with a frequency;
determining a resonant frequency of the trackpad corresponding to a maximum peak-to-peak acceleration of the trackpad; and
comparing the determined resonant frequency with a range of normal resonant frequencies for the trackpad.

10. The method of claim 9, further comprising actively controlling the trackpad by:
measuring instant acceleration following completion of an initial waveform period of a haptic event oscillation of the PCB;
comparing the measured instant acceleration with a target acceleration of the oscillation of the PCB; and
adjusting an output of the haptic element to change the measured instant acceleration to match the target acceleration of the oscillation of the PCB.

11. The method of claim 10, wherein the target acceleration of the oscillation of the PCB is 0 m/s$^2$ and the adjustment operation is to achieve actively controlled braking of the oscillation of the PCB.

12. The method of claim 11, wherein the output of the haptic element is adjusted to an inverse of a residual oscillation waveform of the PCB.

13. The method of claim 9, further comprising:
storing the measured peak-to-peak acceleration of each haptic event oscillation associated with a frequency in a haptic feedback database specific to the trackpad.

14. The method of claim 13, further comprising:
determining an initial gain value for the trackpad; and
storing the initial gain value in the haptic feedback database specific to the trackpad.

15. The method of claim 14, further comprising actively controlling the trackpad by:
firing the haptic element using the determined initial gain value for the trackpad;
comparing measured peak-to-peak acceleration of the oscillation of the PCB using the determined initial gain value with a target peak-to-peak acceleration of the oscillation of the PCB;
adjusting an output of the haptic element to change the measured peak-to-peak acceleration to match the target peak-to-peak acceleration of the oscillation of the PCB in a first feedback loop;
comparing measured current running through the haptic element with a target current running through the haptic element; and
adjusting a power applied to the haptic element to change the measured current running through the haptic element to substantially match the target current running through the haptic element in a second feedback loop.

16. The method of claim 15, wherein adjusting the output of the haptic element includes changing a gain factor for the input current of a next haptic event oscillation of the PCB.

17. The method of claim 15, wherein the first and the second feedback loops are closed feedback loops.

18. A haptic button comprising:
   a frame;
   a printed circuit board (PCB);
   a resiliently deflectable spacer oriented between the frame and the PCB, the resiliently deflectable spacer to permit shear displacement of the PCB with reference to the frame;
   a haptic element fixedly attached to the PCB to selectively oscillate the PCB;
   an accelerometer fixedly attached to the PCB to measure peak-to-peak acceleration of the oscillation of the PCB;
   a current sensor to measure current running through the haptic element; and
   a microcontroller to actively calibrate the haptic button by:
      triggering the haptic element across a range of frequencies;
      measuring peak-to-peak acceleration of haptic event oscillations, each associated with a frequency;
      determining a resonant frequency of the trackpad corresponding to a maximum peak-to-peak acceleration of the haptic button; and
      comparing the determined resonant frequency with a range of normal resonant frequencies for the haptic button.

19. The haptic button of claim 18, further comprising:
   a haptic feedback database specific to the haptic button, wherein measured peak-to-peak accelerations of a series of haptic event oscillations, each associated with an oscillation frequency, are stored within the haptic feedback database, wherein the microcontroller is further to actively calibrate the haptic button by:
      determining an initial gain value for the haptic button; and
      storing the initial gain value in the haptic feedback database specific to the haptic button.

20. The haptic button of claim 19, wherein the microcontroller is further to actively control the haptic button by:
   firing the haptic element using the determined initial gain value for the haptic button;
   comparing measured peak-to-peak acceleration of the oscillation of the PCB using the determined initial gain value with a target peak-to-peak acceleration of the oscillation of the PCB;
   adjusting an output of the haptic element to change the measured peak-to-peak acceleration to match the target peak-to-peak acceleration of the oscillation of the PCB in a first feedback loop;
   comparing measured current running through the haptic element with a target current running through the haptic element; and
   adjusting a power applied to the haptic element to change the measured current running through the haptic element to substantially match the target current running through the haptic element in a second feedback loop.

* * * * *